No. 675,481. Patented June 4, 1901.
C. F. & A. C. JACOBSON.
SACKING DEVICE.
(Application filed Oct. 17, 1900.)
(No Model.)
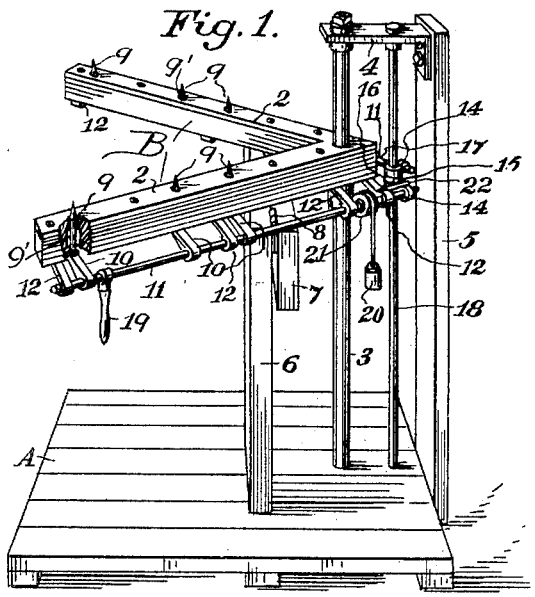
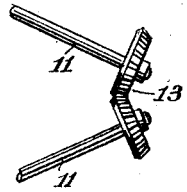
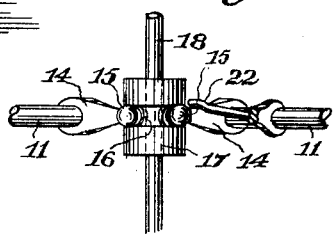
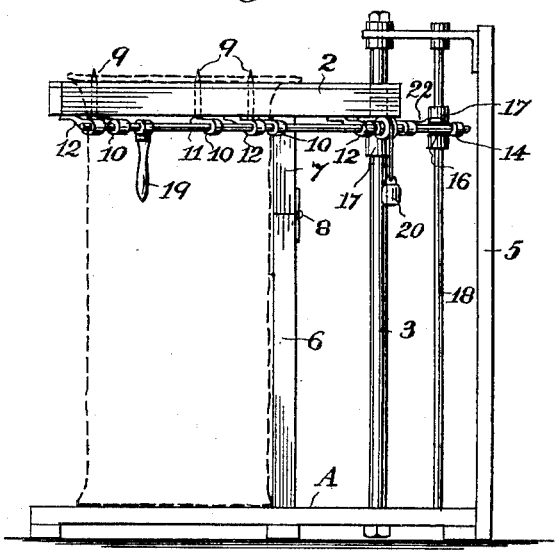
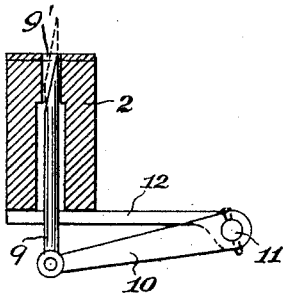
Witnesses,
E. A. Brandau
Inventors,
Christian F. Jacobson
Andrew C. Jacobson
By Dewey Strong & Co.
atty

UNITED STATES PATENT OFFICE.

CHRISTIAN F. JACOBSON AND ANDREW C. JACOBSON, OF BERKELEY, CALIFORNIA.

SACKING DEVICE.

SPECIFICATION forming part of Letters Patent No. 675,481, dated June 4, 1901.

Application filed October 17, 1900. Serial No. 33,351. (No model.)

*To all whom it may concern:*

Be it known that we, CHRISTIAN F. JACOBSON and ANDREW C. JACOBSON, citizens of the United States, residing at Berkeley, county of Alameda, State of California, have invented an Improvement in Sacking Devices; and we hereby declare the following to be a full, clear, and exact description of the same.

Our invention relates to an apparatus which is designed for holding sacks with the mouths open while being filled and releasing the same for removal after they are filled.

It consists of the parts and the constructions and combinations of parts hereinafter described and claimed.

Figure 1 is a perspective view of our improved sacking device. Fig. 2 is a detail view of the mechanism for rotating the shafts inwardly or outwardly. Fig. 3 is a modification of the same. Fig. 4 is an elevation showing the apparatus arranged for filling long sacks. Fig. 5 is a detail section through one of the bars.

We have here shown our apparatus as of such shape and size as to be conveniently placed upon an ordinary platform-scale, so that coal, grain, or other material which is to be simultaneously sacked and weighed can be conveniently handled at a single operation.

A represents a suitable base, and B is a frame, including horizontal bars 2, united at one end and thence diverging to form a V-shaped or triangular space within which the sack is conveniently placed for filling. These bars 2 are slidable upon a vertical standard 3, which may be suitably supported. In the present case its lower end is fixed to the base and the upper end to a bracket 4, which in turn is fixed to a vertical post 5, extending upwardly from the rear of the base.

6 is a support of suitable width fixed upon the base and extending upwardly to such height that the horizontal bars 2 of the frame may rest upon the top of it when the shortest sack, such as a coal-sack, is to be filled. The height is then such that the upper edges of the sack will extend sufficiently above the top of the bars 2 to be attached, as will be hereinafter described, while the bottom rests upon the base A. When longer sacks are to be filled, the bars 2 may be moved upward, sliding upon the standard 3, and when in their elevated position they are supported by a plate or bar 7, which is adjustable with relation to the support 6. Thus it may be placed on the top of the support 6 or it may be slidable with relation thereto or otherwise arranged. In the present case we have shown it hinged, as at 8, and turnable about the hinges, so that when the bars 2 have been raised by turning this plate upward it will stand on the end of and in line with the support 6. The bars 2 will then rest upon its upper end and be supported at the higher elevation.

In order to hold the sack conveniently, we have shown a series of pins or needles 9, slidable through holes 9' in the bars 2 of the frame, having the upper ends pointed sufficiently to easily enter the upper edges of the sack and to hold it in its distended position. These pins 9 are preferably movable, so that they may be projected above the surface of the bars 2 or withdrawn to release the sack after the latter has been filled. This is effected, as here shown, by connecting the pins 9 with crank-arms 10, which are fixed upon rock-shafts 11. These shafts are journaled in suitable brackets or bearings, as at 12, at such a distance from the bars 2 that, being rotated a little, they will either project the pins above the bars 2 or withdraw them below the surface. The rock-shafts 11 converging from the front toward the rear and exterior to the bars 2, their contiguous ends are connected, so that when one of the shafts is turned the other will be turned in unison. They may either be connected, as shown in Fig. 3, by a gearing, as at 13, or, as shown in Fig. 2, by means of arms 14, having rounded or globular heads 15, which enter a groove or channel 16 in a collar 17, which collar is slidable upon a shaft or standard 18 at the rear of the apparatus.

19 is a handle conveniently connected to one of the rock-shafts 11, near the front, within reach of the operator, so that by turning this shaft the points of the pins 9 will be withdrawn below the level of the bars 2, thus releasing a filled sack and allowing it to be easily removed. As soon as the handle is released the bars are returned to their normal position by weights 20, suspended by cords which pass around pulleys, as 21, upon one or both of the rock-shafts 11.

In order to limit the upward movement of the pointed pins, the revolution of the shaft is arrested by means of a stop 22 of any suitable description. In the present case we have shown this stop as projecting from a fixed support in line above one of the arms 14, so that when the latter has been turned downwardly to withdraw the pins, the handle being released, the shafts will turn by the action of the weight 20 until arrested by contact of the arm 14 with the stationary stop. The operation is thus very simple. The points 9 projecting upwardly through the bars 2, a sack is readily hung upon the points, its rear portion resting against the support 6 and the bottom upon the base A. It is filled to the given weight or quantity desired, and then by turning the handle 19 the shafts 11 and their connections are turned and the points withdrawn below the level of the tops of the bars 2, thus releasing the sack and allowing it to be removed without the exertion of lifting it upward. As soon as removed, the handle being released, the points will return and be projected above the bars ready to receive another sack.

Having thus described our invention, what we claim as new, and desire to secure by Letters Patent, is—

1. A sacking device including a base, a vertical standard, a frame guided upon said standard, means for supporting the frame, pins mounted in the frame, and means whereby the pins are projected or retracted to engage or release the sack.

2. A sacking device including a base, a vertical standard, a frame composed of diverging bars guided on said standard, means for supporting the frame, sack-engaging devices, rock-shafts and means for operating the same, and arms on said shafts and connected with the sack-engaging devices for operating the latter, whereby the sack may be engaged or disengaged.

3. A sacking device including a base, a vertical standard, a frame composed of diverging bars guided on said standard, a support upon which the frame rests, means whereby the height of the support may be increased and the frame held at a higher elevation, pins guided in the frame-bars, and rock-shafts and connections whereby the pins may be projected or retracted to engage or disengage the sack.

4. A sacking device including a base, a vertical standard, a frame composed of diverging bars united at one end and guided on the standard, a support for the frame, rock-shafts parallel with the frame-bars and means connecting them so that they operate in unison, pins guided in the frame-bars and arms connecting the pins with the rock-shafts, and an operating-handle whereby the shafts are rocked to project or retract the pins.

5. A sacking device including a base, a vertical standard, a frame composed of diverging bars guided on said standard, a support for the frame, rock-shafts parallel with the diverging frame-bars, pins mounted in the frame-bars and means connecting them with the rock-shafts, a vertical shaft and means supporting the converging ends of the rock-shafts therefrom, and means for operatively connecting the converging ends of said shafts whereby both shafts operate in unison.

6. A sacking device including a base, a vertical standard, a frame guided thereon and composed of diverging bars, a support for the frame, rock-shafts parallel with the diverging frame-bars, pins guided in the frame-bars and connections between the pins and the rock-shafts, a vertical shaft, a grooved collar slidable thereon, arms on the converging portions of the rock-shafts and having heads engaging the groove in said collar whereby the rock-shafts operate in unison, means for rocking the shafts in one direction, and a counterweight for moving the shafts in the opposite direction.

7. A sacking device including a base, a vertical standard, a frame composed of diverging bars, a support for the frame, pins mounted in the frame-bars and connected rock-shafts and devices for operating the pins, a lever for operating the shafts to move the pins in one direction, a counterweight for moving the pins in the opposite direction, and a stop to limit the return movement of the shafts.

In witness whereof we have hereunto set our hands.

CHRISTIAN F. JACOBSON.
ANDREW C. JACOBSON.

Witnesses:
F. L. LATHROP,
C. H. McLENATHEN.